(12) United States Patent
Popescu

(10) Patent No.: US 7,623,030 B1
(45) Date of Patent: Nov. 24, 2009

(54) DISTANCE DETERMINATION AND ALARM SYSTEM

(76) Inventor: Marian Popescu, 17 Kettlebastion Road, Leyton, London (GB) E10 7PE (*) Notice: Subject to any disclaimer, the term of this patent is extended or adjusted under 35 U.S.C. 154(b) by 429 days.

(21) Appl. No.: 11/365,397

(22) Filed: Mar. 1, 2006

(51) Int. Cl.
*G08B 1/00* (2006.01)
*G08B 23/00* (2006.01)

(52) U.S. Cl. .............. 340/539.23; 340/539.1; 340/539.15; 340/539.21; 340/825.72; 340/573.3; 340/573.4

(58) Field of Classification Search .................. None
See application file for complete search history.

(56) References Cited

U.S. PATENT DOCUMENTS

| | | |
|---|---|---|
| 4,101,873 A | 7/1978 | Anderson et al. |
| D339,757 S | 9/1993 | Feeney |
| 5,576,692 A | 11/1996 | Thompkins et al. |
| 5,589,821 A | 12/1996 | Sallen et al. |
| 5,892,447 A * | 4/1999 | Wilkinson ............... 340/573.4 |
| 6,198,930 B1 | 3/2001 | Schipper |
| 6,366,202 B1 | 4/2002 | Rosenthal |
| 6,486,777 B2 * | 11/2002 | Clark ...................... 340/539.1 |
| 2002/0097152 A1* | 7/2002 | Mengrone et al. ........... 340/571 |
| 2003/0011478 A1* | 1/2003 | Rabanne et al. .......... 340/573.4 |
| 2004/0119594 A1* | 6/2004 | Sanchez et al. .......... 340/573.4 |

* cited by examiner

*Primary Examiner*—Julie Lieu

(57) ABSTRACT

A distance determination and alarm system for alarming when a wireless transmitter is either close or distant, having a wireless transmitter for transmitting an emitter signal. A wireless receiver is for receiving the emitter signal. The wireless receiver is for resolving the distance between the wireless transmitter and the wireless receiver. A proximity switch is electrically connected to the wireless receiver for selectable switching between within boundary alarm and out of boundary alarm. An alarm is electrically connected to the wireless receiver.

2 Claims, 3 Drawing Sheets

DISTANCE DETERMINATION AND ALARM SYSTEM

BACKGROUND OF THE INVENTION

1. Field of the Invention

The present embodiment of the invention relates to a distance determination and alarm system for use in connection with alarm systems. The distance determination and alarm system has particular utility in connection with alarm systems that can be switched between alarming for proximal and distal distances.

2. Description of the Prior Art

Distance determination and alarm systems are desirable for being able to be warned if a transmitter is exceeding a specific distance to prevent loss. A need was felt for a switchable distance determination and alarm system that could be set to alarm when distances are being exceeded or whenever the transmitter is proximate to the receiver.

The use of alarm systems is known in the prior art. For example, U.S. Pat. No. 5,589,821 to Sallen et al. discloses a distance determination and alarm system generates an alarm at one unit of the system when a second unit of the system is more than a predetermined distance from the first unit. The system has a first transceiver unit with a first transmitter for transmitting a first reference signal having a phase with respect to a reference source, and a first receiver for detecting a second reference signal having a phase which bears a relationship to that of the first reference signal. There is a second, portable, transceiver unit with a second transmitter for transmitting the second reference signal after receipt of the first reference signal. The first transceiver unit includes a distance resolver for determining the distance between the two transceiver units from the phases of the first and second reference signals, and an alarm, responsive to the distance resolver, for generating an alarm signal if the distance between the two transceiver units is more than a predetermined amount. However, the Sallen et al. '821 patent does not have the ability to switch between preferential distal or proximate transmitter to receiver distances.

Similarly, U.S. Pat. No. 6,366,202 to Rosenthal discloses a paired lost item finding system including at least two nearly identical locators. Either one can be used to find the other and whatever items are attached to it. In the preferred embodiment, acoustic signals near 6500 Hz are used to broadcast a search signal from an available locator to a lost one. Preferably, the search signal includes a sequences of tones having predetermined frequency differences between them. The lost locator is usually in a sleep mode, in which it nonetheless is capable of recognizing the beginning of the search signal. The locator turns on to an active mode in which it consumes more power. It determines the baseline frequency and then identifies whether the signal it is receiving conforms to the predetermined frequency differences between the sequence of tones. If it does, the lost locator transmits a beacon signal that can be perceived by the user as he searches for the lost item. The beacon signal may include both an audible signal and a flashing light emitting diode. Another feature allows the number of false alarms to be reduced, particularly in a noisy environment, but also allows the locators to be operable in a noisy environment. Yet further capabilities include the selection of baseline frequencies or the temporary deactivation of additionally available locators. Advantageously, both the transmission and reception of the audio signal is accomplished with one piezoelectric transducer, and the efficiency of the transducer is increased by forming a resonant cavity having a cap both protecting the piezoelectric transducer and forming a side emitting annular port. However, the Rosenthal '202 patent does not have the ability to switch between preferential distal or proximate transmitter to receiver distances.

Likewise, U.S. Pat. No. 5,576,692 to Tompkins et al. discloses a nationwide airport luggage tracking system for tracking luggage pieces in any airport across a wide geographic area involves the attaching of a beeper paging unit to each luggage piece and causing any selected beeper units to beep wherever located in a geographic area served by a paging system. However, the Tompkins et al. '692 patent does not have the ability to switch between preferential distal or proximate transmitter to receiver distances.

Further, U.S. Pat. No. 4,101,873 to Anderson et al. discloses a device to locate commonly misplaced objects has miniaturized coded transmitter and battery powered receivers selectively responsive to a predetermined code transmission are provided with a miniaturized audible signal generator in each receiver such that the receiver, when interrogated by a proper signal, will respond audibly. By placing such receivers on commonly used objects such as eyeglasses, purses and other personal articles, audible location of these articles is accomplished by interrogating each object with a corresponding coded signal and following the audible response from the object to the position of the object to locate the latter. The duty cycle of the receiver is very short and recurrent over intervals less than the known energization interval of the transmitter to insure reception but materially minimize the power consumption of the receivers. However, the Anderson et al. '873 patent does not have the ability to switch between preferential distal or proximate transmitter to receiver distances.

Still further, U.S. Pat. No. Des. 339,757 to Feeney discloses a combined transmitter and receiver for a child locator. However, the Feeney '757 patent does not have the ability to switch between preferential distal or proximate transmitter to receiver distances.

Lastly, U.S. Pat. No. 6,198,930 to Schipper discloses a system for tracking the location of, and for providing cellular telephone handoff for, a mobile cell phone user as the cell phone user moves from one cell zone to another. A boundary curve between a first cell zone and an adjacent second cell zone is defined in an electronic map by an equation for points with spatial location coordinates lying on the curve. First and second quasi-boundary curves, lying within the first and second cell zones, respectively, are defined, where each point on the curve lies at a selected distance from the boundary curve. A region of points lying between the quasi-boundary curves and including the boundary curve is defined. The present location of the cell phone user is determined using a Satellite Positioning System (SATPS) such as GPS or GLONASS. Cellular telephone service for the cell phone user is provided by a first cellular service provider or by a second cellular service provider, when the cell phone user is located within the first cell zone, not including the overlap region within the second cell zone. When the cell phone user enters the region from within the first cell zone and proceeds toward the boundary curve, the system carried by the cell phone user notifies at least one of the first and second cellular service providers that the cell phone user is about to leave the first cell zone and about to enter the second cell zone. The system may be extended to determine the approximate location of a missing vehicle and to dynamically change the boundary curves of at least one cell zone to relieve cellular service overloading that occurs within that cell zone. However, the Schipper '930 patent does not have the ability to switch between preferential distal or proximate transmitter to receiver distances.

While the above-described devices fulfill their respective, particular objectives and requirements, the aforementioned patents do not describe a distance determination and alarm system that allows alarm systems that can be switched between alarming for proximal and distal distances. The Sallen et al. '821, Rosenthal '202, Tompkins et al. '692, Anderson et al. '873, Feeney '757 and Schipper '930 patents make no provision for the ability to switch between preferential distal or proximate transmitter to receiver distances.

Therefore, a need exists for a new and improved distance determination and alarm system which can be used for alarm systems that can be switched between alarming for proximal and distal distances. In this regard, the present embodiment of the invention substantially fulfills this need.

In this respect, the distance determination and alarm system according to the present embodiment of the invention substantially departs from the conventional concepts and designs of the prior art, and in doing so provides an apparatus primarily developed for the purpose of alarm systems that can be switched between alarming for proximal and distal distances.

SUMMARY OF THE INVENTION

In view of the foregoing disadvantages inherent in the known types of alarm systems now present in the prior art, the present embodiment of the invention provides an improved distance determination and alarm system, and overcomes the above-mentioned disadvantages and drawbacks of the prior art. As such, the general purpose of the present embodiment of the invention, which will be described subsequently in greater detail, is to provide a new and improved distance determination and alarm system and method which has all the advantages of the prior art mentioned heretofore and many novel features that result in a distance determination and alarm system which is not anticipated, rendered obvious, suggested, or even implied by the prior art, either alone or in any combination thereof.

To attain this, the present embodiment of the invention essentially comprises a distance determination and alarm system having a wireless transmitter for transmitting an emitter signal. A wireless receiver is for receiving the emitter signal. The wireless receiver is for resolving the distance between the wireless transmitter and the wireless receiver. A proximity switch is electrically connected to the wireless receiver for selectable switching between within boundary alarm and out of boundary alarm. An alarm is electrically connected to the wireless receiver. The alarm is for alarming when the proximity switch is switched to within boundary alarm and the wireless receiver is within a preset distance of the wireless transmitter. The alarm is for alarming when the proximity switch is switched to out of boundary alarm and the wireless receiver is outside of the preset distance of the wireless transmitter.

There has thus been outlined, rather broadly, the more important features of the embodiment of the invention in order that the detailed description thereof that follows may be better understood and in order that the present contribution to the art may be better appreciated.

The present embodiment of the invention may also include a remote activation emitter, a remote activation receiver, an automobile connection, a visual display, a buzzer, a cellular phone interface, a receiver power supply, a feedback display, a timer clock, an altimeter switch and a cell phone battery case housing. There are, of course, additional features of the present embodiment of the invention that will be described hereinafter and which will form the subject matter of the claims attached.

Numerous objects, features and advantages of the present embodiment of the invention will be readily apparent to those of ordinary skill in the art upon a reading of the following detailed description of presently preferred, but nonetheless illustrative, embodiments of the present embodiment of the invention when taken in conjunction with the accompanying drawings. In this respect, before explaining the current embodiment of the embodiment of the invention in detail, it is to be understood that the embodiment of the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present embodiment of the invention.

It is therefore an object of the present embodiment of the invention to provide a new and improved distance determination and alarm system that has all of the advantages of the prior art alarm systems and none of the disadvantages.

It is another object of the present embodiment of the invention to provide a new and improved distance determination and alarm system that may be easily and efficiently manufactured and marketed.

An even further object of the present embodiment of the invention is to provide a new and improved distance determination and alarm system that has a low cost of manufacture with regard to both materials and labor, and which accordingly is then susceptible of low prices of sale to the consuming public, thereby making such distance determination and alarm system economically available to the buying public.

Still another object of the present embodiment of the invention is to provide a new distance determination and alarm system that provides in the apparatuses and methods of the prior art some of the advantages thereof, while simultaneously overcoming some of the disadvantages normally associated therewith.

Lastly, it is an object of the present embodiment of the invention is to provide a distance determination and alarm system for alarm systems that can be switched between alarming for proximal and distal distances between the transmitter and receiver.

These together with other objects of the embodiment of the invention, along with the various features of novelty that characterize the embodiment of the invention, are pointed out with particularity in the claims annexed to and forming a part of this disclosure. For a better understanding of the embodiment of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The embodiment of the invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
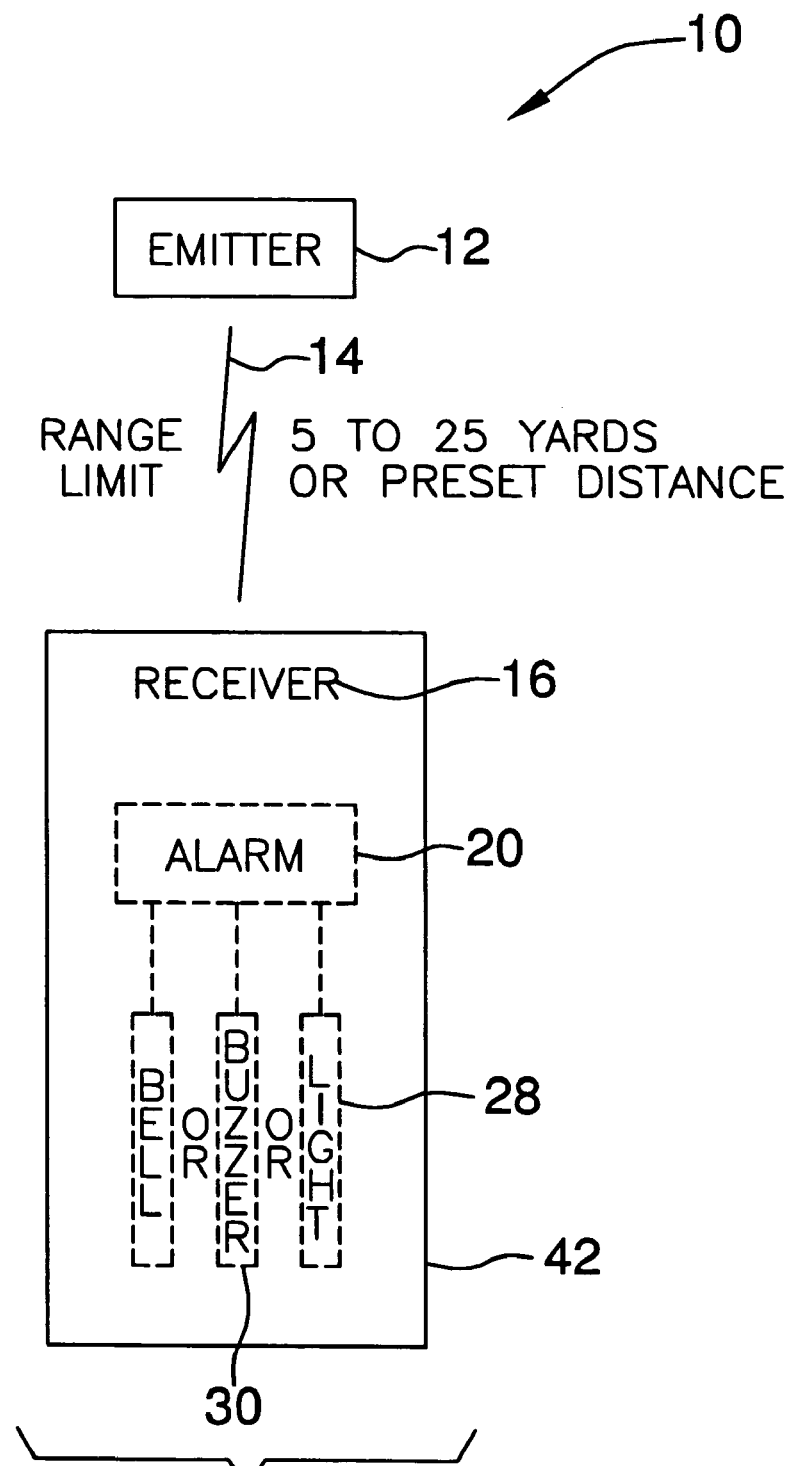
FIG. 1 is a block diagram view of the preferred embodiment of the distance determination and alarm system constructed in accordance with the principles of the present invention.
Figure 2:
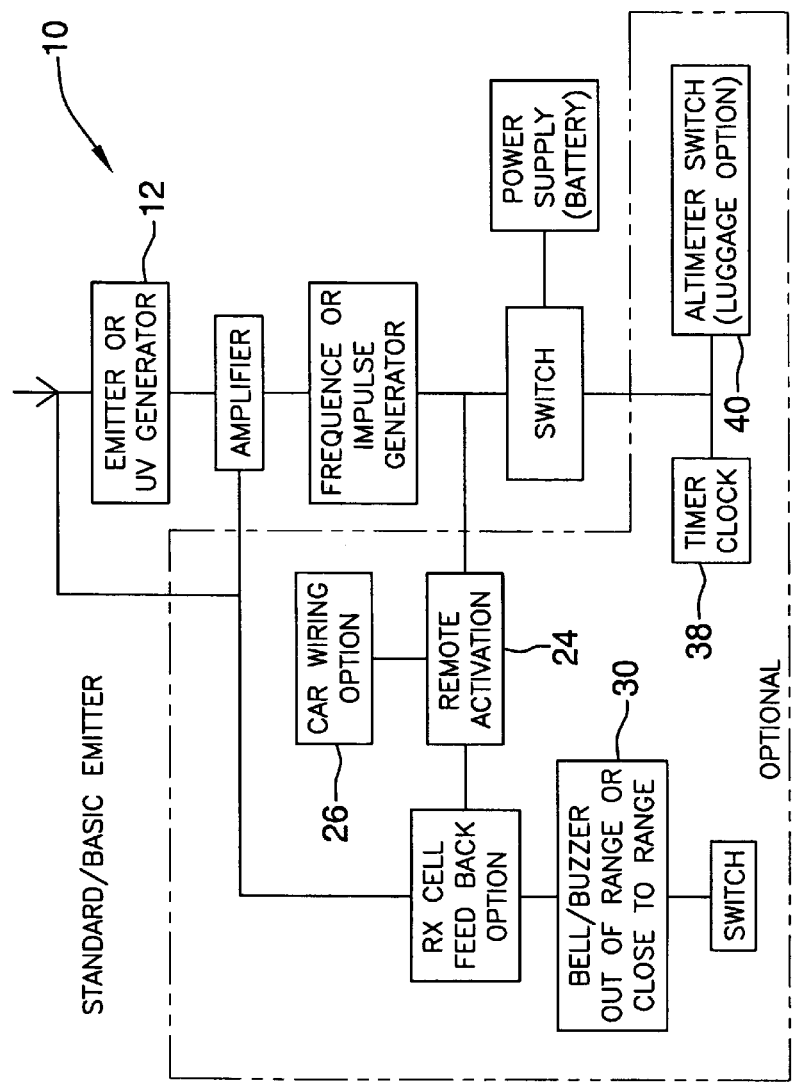
FIG. 2 is a block diagram view of the distance determination and alarm system of the present embodiment of the invention.
Figure 3:
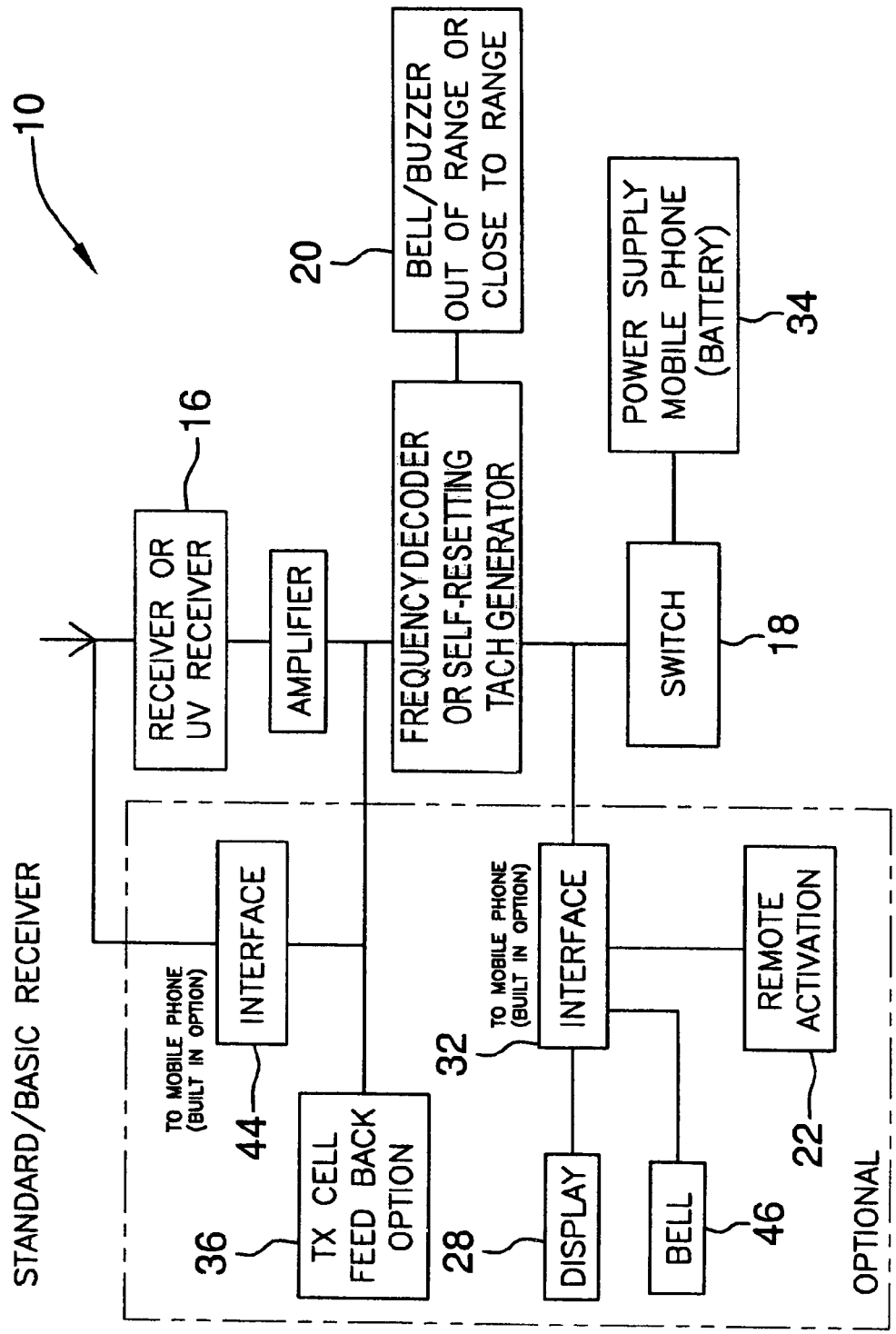
FIG. 3 is a block diagram view of the distance determination and alarm system of the present embodiment of the invention.

Referring now to the drawings, and particularly to FIGS. 1-3, a preferred embodiment of the distance determination and alarm system of the present invention is shown and generally designated by the reference numeral 10.

In FIG. 1, a new and improved distance determination and alarm system 10 of the present invention for alarm systems that can be switched between alarming for proximal and distal distances is illustrated and will be described. More particularly, the distance determination and alarm system 10 has a wireless transmitter 12 for transmitting a emitter signal 14. A wireless receiver 16 is for receiving the emitter signal 14. The wireless receiver 16 is for resolving the distance between the wireless transmitter 12 and the wireless receiver 16. A cellular phone battery case housing 42 is connected to the wireless receiver 16. An alarm 20 is electrically connected to the wireless receiver 16. A visual display 28 is electrically connected to the alarm 20. A buzzer 30 is electrically connected to the alarm 20.

In FIG. 2, the distance determination and alarm system 10 is illustrated and will be described. More particularly, the distance determination and alarm system 10 has the wireless transmitter 12 for transmitting the emitter signal 14. A remote activation receiver 24 is electrically connected to the wireless transmitter 12 and is responsive to a remote activation emitter 22 (shown in FIG. 3). An automobile connection 26 is electrically connectable to the conventional automobile horn. The automobile connection 26 is electrically connected to the remote activation receiver 24. The buzzer 30 is electrically connected to the remote activation receiver 24. A timer clock 38 is electrically connected to the wireless transmitter 12 for limiting the time of the wireless transmission. An altimeter switch 40 is electrically connected to the wireless transmitter 12 for limiting wireless transmissions below the preset altitude.

In FIG. 3, the distance determination and alarm system 10 is illustrated and will be described. More particularly, the distance determination and alarm system 10 has the wireless receiver 16 is for receiving the emitter signal 14. The wireless receiver 16 is for resolving the distance between the wireless transmitter 12 (shown in FIG. 1) and the wireless receiver 16. The cellular phone battery case housing 42 (shown in FIG. 1) is connected to the wireless receiver 16. A proximity switch 18 is electrically connected to the wireless receiver 16 for selectable switching between within boundary alarm and out of boundary alarm. The alarm 20 is electrically connected to the wireless receiver 16. The alarm 20 is for alarming when the proximity switch 18 is switched to within boundary alarm and the wireless receiver 16 is within the preset distance of the wireless transmitter 12. The alarm 20 is for alarming when the proximity switch 18 is switched to out of boundary alarm and the wireless receiver 16 is outside of the preset distance of the wireless transmitter 12. The remote activation receiver 24 (shown in FIG. 2) is electrically connected to the wireless transmitter 12 (shown in FIG. 2) and is responsive to the remote activation emitter 22. The buzzer 30 can be replaced with a pre-recorded message player unit or a recordable message player unit activated via remote activation 24 or receiver cell feed back option. The cellular phone interface 32 is electrically connectable to a cellular phone display to display the alarm, settings and status of wireless receiver and wireless transmitter, upon a cellular phone display screen 28. The buzzer 30 in the present embodiment may be replaced with a pre-recorded message player unit activated by said remote activation receiver 24. The buzzer 30 in the present embodiment may be replaced with a pre-recorded message player unit activated by said wireless receiver 16. A cellular phone interface 32 is electrically connected to the wireless receiver 16. The cellular phone interface 32 is electrically connectable to the cellular phone to display the alarm upon a cellular phone display screen 44. The cellular phone interface 32 is electrically connectable to the cellular phone ringer 46 and to the cellular phone keypad to facilitate settings and transmit it to proximity switch 18 and remote activation 22. The cellular phone interface 32 is electrically connectable to the cellular phone to display the settings and status of the wireless receiver 16 and wireless transmitter 12 upon the visual display 28. The cellular phone interface 32 is electrically connectable to a cellular phone ringer 46. The cellular phone interface is for setting system settings and for transmitting these settings to the proximity switch 18 and the remote activation emitter 22. A receiver power supply 34 is for supplying power to the wireless receiver 16. A feedback display 36 could display the distance between the wireless transmitter 12 and the wireless receiver 16 and system status and settings, the system status and settings. The receiver power supply 34 is for supplying power to the wireless receiver 16. The receiver power supply 34 is for supplying power to the cellular phone. The remote activation emitter 22 activates and deactivates the wireless transmitter 12 using wireless technology such as ultraviolet, infrared, radio frequency or magnetic signaling. The wireless receiver 16 activates the buzzer 30 when selectively distal or proximate to said preset range to said wireless transmitter 12. Coding the emitter signal 14 can be preset or individually set by the user selecting his own personal identification number. The personal identification number could be entered using the cellular phone interface 32. Downloading the encoded signal between the wireless receiver 16 and the wireless transmitter 12 can be done via the remote activation emitter 22 using wireless technology such as ultraviolet, infrared, radio frequency or magnetic signaling. The remote activation 22 will activate and deactivate the wireless transmitter power supply. The wireless feed back receiver cell 36 (shown in FIG. 3) is electrically connected with wireless feed back receiver cell (shown in FIG. 2) when out or within a preset range. Coding the emitted signal could be preset or set up by each individual system owner by selecting his own combination code using the mobile phone keypad interface 32. Downloading the encoded signal and settings between the wireless receiver 16 and wireless transmitter 12 will be done by remote activation 2 from the wireless receiver 16, electrically connected with remote activation 24 from wireless transmitter 12.

In use, it can now be understood that the proximity switch 18 is set and the wireless receiver 16 alarms when either the wireless transmitter 12 goes beyond a preset distance or approaches the wireless receiver 16 within a preset distance.

While a preferred embodiment of the distance determination and alarm system has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present embodiment of the invention. For example, any suitable wireless communication media may be used instead of the radio frequency carrier wave described. And although alarm systems that can be switched between alarming for proximal and distal distances have been described, it should be appreciated that the distance determination and alarm system herein described is also suitable for locating any object and helping to prevent any object from being lost.

Therefore, the foregoing is considered as illustrative only of the principles of the embodiment of the invention. Further, since numerous modifications and changes will readily occur to those skilled in the art, it is not desired to limit the embodiment of the invention to the exact construction and operation shown and described, and accordingly, all suitable modifications and equivalents may be resorted to, falling within the scope of the embodiment of the invention.

I claim:

1. A distance determination and alarm system comprising:
    a wireless transmitter for transmitting an emitter signal;
    a wireless receiver for receiving said emitter signal, said wireless receiver for resolving the distance between said wireless transmitter and said wireless receiver;
    a proximity switch electrically connected to said wireless receiver for selectable switching between within boundary alarm and out of boundary alarm;
    an alarm electrically connected to said wireless receiver, said alarm for alarming when said proximity switch is switched to within boundary alarm and said wireless receiver is within a preset distance of said wireless transmitter, said alarm for alarming when said proximity switch is switched to out of boundary alarm and said wireless receiver is outside of said preset distance of said wireless transmitter;
    a remote activation emitter electrically connected to said wireless receiver, said remote activation emitter being portable;
    a remote activation receiver electrically connected to said wireless transmitter responsive to said remote activation emitter, said remote activation receiver electrically connected to a conventional automobile car locking wiring and horn;
    a cellular phone battery case housing connected to said wireless receiver;
    a buzzer electrically connected to said remote activation receiver;
    a cellular phone interface electrically connected to said wireless receiver, said cellular phone interface electrically connectable to a cellular phone to display said alarm upon a cellular phone display screen, said cellular phone interface electrically connectable to a cellular phone ringer;
    an emitter power supply electrically connected to said remote activation emitter;
    a feedback display electrically connected to a conventional cellular phone display screen for displaying the distance between said wireless transmitter and said wireless receiver;
    a timer clock electrically connected to said wireless transmitter for limiting the time of an wireless transmission; and
    an altimeter switch electrically connected to said wireless transmitter for limiting wireless transmissions below a preset altitude.

2. A distance determination and alarm system comprising:
    a wireless transmitter for transmitting an emitter signal;
    a wireless receiver for receiving said emitter signal, said wireless receiver for resolving the distance between said wireless transmitter and said wireless receiver;
    a proximity switch electrically connected to said wireless receiver for selectable switching between within boundary alarm and out of boundary alarm;
    an alarm electrically connected to said wireless receiver, said alarm for alarming when said proximity switch is switched to within boundary alarm and said wireless receiver is within a preset distance of said wireless transmitter, said alarm for alarming when said proximity switch is switched to out of boundary alarm and said wireless receiver is outside of said preset distance of said wireless transmitter;
    a cellular phone battery case housing connected to said wireless receiver;
    a remote activation emitter electrically connected to said wireless receiver;
    a remote activation receiver electrically connected to said wireless receiver responsive to said remote activation emitter;
    an automobile connection electrically connectable to a conventional automobile horn, said automobile connection electrically connected to a conventional automobile lock, said automobile connection electrically connected to said remote activation receiver;
    a buzzer electrically connected to said wireless receiver;
    a cellular phone interface electrically connected to said wireless receiver, said cellular phone interface electrically connectable to a cellular phone to display said alarm upon a cellular phone display screen, said cellular phone interface electrically connectable to a cellular phone ringer;
    a receiver power supply electrically connected to said wireless receiver, said power supply for supplying power to a cellular phone;
    a feedback display electrically connected to a conventional cellular phone display screen for displaying the distance between said wireless transmitter and said wireless receiver;
    a timer clock electrically connected to said wireless transmitter for limiting the time of an wireless transmission; and
    an altimeter switch electrically connected to said wireless transmitter for limiting wireless transmissions below a preset altitude.

* * * * *